Patented June 5, 1951

2,555,512

UNITED STATES PATENT OFFICE 2,555,512

PREPARATION OF DIBORANE

Hermann I. Schlesinger, Chicago, Ill., and Herbert C. Brown, Detroit, Mich., assignors to the United States of America as represented by the United States Atomic Energy Commission No Drawing. Application November 13, 1946, Serial No. 709,411

16 Claims. (Cl. 23—204)

This invention relates to a process for the recovery of diborane from mixtures containing the same. More specifically it relates to the recovery of diborane from crude mixtures containing diborane and hydrogen halides, by contacting such mixtures with a suitable amine and separating the resultant products.

There are numerous occasions in which it is desirable to recover diborane from its crude mixtures. This is particularly true in the arc discharge method of diborane manufacture described by Schlesinger and Burg, in the Journal of the American Chemical Society, vol. 53, pp. 4331–2 (1931); and Stock and Sutterlein, Berichte der Deut. Chem. Ges., vol. 67B, pp. 407–411 (1934).

The above method comprises reacting hydrogen and a boron trihalide in an arc discharge. The resulting hydrogen halides, diborane halides, and unused boron halides are condensed from the excess hydrogen, and fractionated to remove the free hydrogen halide formed in the reaction. The diborane halide is then decomposed in a fractionating column after which the fractions rich in boron hydrides are subjected to a further process of fractional condensation, and the diborane which is contaminated with hydrogen halide finally purified by a direct vacuum distillation from a tube at —150° C. The method of purification described above is exceedingly slow, and requires great experimental skill to produce a satisfactory separation. An additional disadvantage of this process is that when boron trichloride is employed, the difficulty of removing the acidic impurities is much greater than when the boron tribromide is used and hence a material reduction in yield of diborane is observed. This, in effect, limits the arc process to the use of boron tribromide as a reactant.

It has now been discovered that the associated hydrogen halides may be effectively and economically removed from crude mixtures of diborane and hydrogen halides by a simple chemical procedure, and that this process is not limited to any one halide, but reacts equally well with all halides normally used. This procedure is very rapid, effecting the purification in one step, and yields a product which contains insignificant quantities of hydrogen halide.

The process of the present invention comprises contacting the impure reaction mixture with an amine which will form addition compounds with the contaminating halide, said compounds having a lower vapor pressure than diborane, and a moderate amount of thermal stability. While a number of different types of amines have been found suitable for use in the process of the present invention, the tertiary amines are generally preferable, and especially the trialkyl amines such as trimethyl amine and the heterocyclic aromatic tertiary amines, such as pyridine, the lutidines, the picolines, and the quinolines. Of the tertiary amines available, pyridine has been found to be particularly suitable for the separation of the hydrogen halides which contaminate diborane obtained by the arc discharge method. The purity of the diborane obtained by the use of the process of this invention is of the order of 99.9%.

The reactions involved are complex, but it is believed that they are of two general types: (A) the amine reacts directly with the hydrogen halide, and (B) the amine first reacts with the diborane to form an amine-borine product, which, in turn, reacts with the hydrogen halide. These reactions may be illustrated by the following equations using pyridine as the amine and hydrogen bromide as the hydrogen halide:

*A*

$C_5H_5N + HBr \longrightarrow C_5H_5N:HBr$ or $C_5H_5N + B_2H_5Br + H_2 \longrightarrow B_2H_6 + C_5H_5N:HBr$

*B*

$2C_5H_5N + B_2H_6 \longrightarrow 2C_5H_5N:BH_3$ $C_5H_5N:BH_3 + 2HBr \longrightarrow C_5H_5N:BHBr_2 + 2H_2$ It is evident that in reactions of type B, the quantity of amine used should generally be limited to that amount necessary to remove the hydrogen halide from the mixture, since an excess of amine will react with diborane and hence reduce the yield of the latter. In the use of this invention to purify diborane produced by the arc discharge method, it has been found that the hydrogen halide will constitute from about 7 to 14% of the mixture, so that the amount of amine used corresponds usually to that amount required to react quantitatively with all of the hydrogen halide present in the reaction mixture.

Diborane reacts vigorously with amines and water at higher temperatures, hence it has been found necessary to conduct the reaction in a high vacuum-low temperature apparatus. A preferable manner of contacting the reactants comprises condensing the vapors in a reaction chamber at low temperature and pressure. When pyridine is used as the amine, it has been found that this object may be accomplished by using liquid nitrogen as the coolant, with a pressure of about $10^{-4}$ mm. The reactants should be maintained under these conditions until the reaction goes to completion, after which the hydrogen, which is a product of the reaction, is evacuated from the system, and the separation of the diborane is effected by permitting the temperature to rise, whereupon the diborane evaporates and is collected as a gas.

This invention may be further illustrated by the description of its use in the purification of diborane obtained by the reaction of hydrogen and boron tribromide when a mixture of these reactants is exposed to an arc discharge in the usual manner.

*Example*

Hydrogen is purified by passing it through a tube filled with platinized asbestos maintained at 450° C. and then dried by passing it through phosphorous pentoxide deposited on glass beads. The hydrogen is then bubbled through 10–20 cc. of liquid boron tribromide at 25–30° C., becoming saturated with the vapor of the halide. Thereafter the hydrogen-boron tribromide mixture thus obtained is admitted to a reaction chamber at a pressure of 15 mm. This chamber is water cooled, and contains two copper electrodes 7 cm. apart, across which an arc is maintained with a current of 40 to 50 milliamperes at 12,000 volts. A rate of flow of the mixture of about 700 cc. per minute is maintained through the reaction chamber and the resultant products are then collected in a trap of conventional design cooled with solid carbon dioxide. The bulk of the free hydrogen bromide is removed from the effluent stream by using liquid nitrogen to condense it in a second trap. The hydrogen being still in the gaseous state, is pumped off from the system. Upon completion of the run, the product is distilled from the trap into the bulb of a generator, which is placed in a water bath at 95–100° C. The diborane as it issues from the generator is cooled with solid carbon dioxide, and condensed by liquid nitrogen. The diborane at this stage contains from about 7 to 14% of hydrogen bromide as an impurity. When the generation of diborane is complete, the hydrogen is removed from the system, and the system is evacuated to $10^{-4}$ mm. The diborane is then condensed with sufficient pyridine to react with the contaminating hydrogen bromide, by cooling with liquid nitrogen. After approximately two hours the hydrogen is removed and the purified diborane, which comes off as a gas upon heating, is collected in a bulb and sealed off at approximately one atmosphere pressure. In a typical run using this method, 1200 cc. of hydrogen saturated with boron tribromide, at 25° C. and at atmospheric pressure, was passed through the arc at a pressure of 23 mm., using a current of 30 milliamperes. The boron tribromide used was introduced at a rate of 29.7 cc. (79 g.) per hour. Under these conditions diborane was produced at a rate of 264 cc. (at standard conditions) per hour. The purity of the diborane thus obtained was 99.9%. The yield was 85%. This compares with yields obtained by prior art procedures of 60 to 70 percent when boron trichloride is used, and up to 80 percent when boron tribromide is used. (Schlesinger and Burg, Chemical Reviews, 31, 12. 1942.)

Although this invention is illustrated by an example showing its use in connection with the production of diborane by the arc discharge method with boron tribromide, it is not limited to this process and may be used for the separation of diborane from any diborane-hydrogen halide mixture.

What is claimed is:

1. In a process for the purification of diborane which is contaminated with hydrogen halides, the step which comprises contacting a mixture of said diborane and hydrogen halides with an amine, while maintaining reduced temperature and reduced pressure, said amine being added in substantially stoichiometric quantity corresponding to the amount required for reaction with the hydrogen halide present.

2. In a process for the purification of diborane which is contaminated with hydrogen halides, the step which comprises contacting a mixture of said diborane and hydrogen halides with a tertiary amine, said amine being added in substantially stoichiometric quantity corresponding to the amount required for reaction with the hydrogen halide present.

3. In a process for the purification of diborane which is contaminated with hydrogen halides, the step which comprises contacting a mixture of said diborane and hydrogen halides with pyridine, said pyridine being added in substantially stoichiometric quantity corresponding to the amount required for reaction with the hydrogen halide present.

4. In a process for the purification of diborane which is contaminated with hydrogen bromide, the step which comprises contacting a mixture of diborane and hydrogen bromide with a tertiary amine, said amine being added in substantially stoichiometric quantity corresponding to the amount required for reaction with the hydrogen bromide present.

5. In a process for the purification of diborane which is contaminated with hydrogen bromide, the step which comprises contacting a mixture of diborane and hydrogen bromide with pyridine, said pyridine being added in substantially stoichiometric quantity corresponding to the amount required for reaction with the hydrogen bromide present.

6. In a process for the purification of diborane which is contaminated with hydrogen chloride, the step which comprises contacting a mixture of diborane and hydrogen chloride with pyridine, said pyridine being added in substantially stoichiometric quantity corresponding to the amount required for reaction with the hydrogen chloride present.

7. A process for the recovery of diborane from a gaseous mixture containing that compound together with a hydrogen halide contaminant, which comprises contacting said mixture with an amine in substantially stoichiometric quantity with regard to the hydrogen halide present, and thereafter separating the diborane from the resulting amine addition product.

8. A process for the recovery of diborane from a gaseous mixture containing that compound together with hydrogen bromide, which comprises contacting said mixture with pyridine in substantially stoichiometric quantity with regard to the hydrogen bromide present, and thereafter separating the diborane from the resulting pyridine addition product.

9. A process for the recovery of diborane from a gaseous mixture containing that compound together with hydrogen chloride, which comprises contacting said mixture with pyridine in substantially stoichiometric quantity with regard to the hydrogen chloride present, and thereafter separating the diborane from the resulting pyridine addition product.

10. The method of separating diborane from gaseous mixtures containing diborane and hydrogen halides which comprises reacting the mixture with an amine in substantially stoichiometric quantity with regard to the hydrogen halide present, at temperatures below the boiling points of the components of the mixture, and distilling off the diborane.

11. The method of separating diborane from a gaseous mixture containing diborane and a hydrogen halide, which comprises reacting the mixture with pyridine in substantially stoichiometric quantity with regard to the hydrogen halide present at temperatures below the boiling points of the said components of the mixture, and distilling off the diborane.

12. The method of separating diborane from a gaseous mixture containing diborane and hydrogen bromide, which comprises reacting the mixture with pyridine in substantially stoichiometric quantity with regard to the hydrogen bromide present at temperatures below the boiling points of the said components of the mixtures, and distilling off the diborane.

13. The method of separating diborane from gaseous mixtures containing diborane and hydrogen halides which comprises reacting the mixture with a lutidine in substantially stoichiometric quantity with regard to the hydrogen halide present at temperatures below the boiling points of the components of the mixture, and distilling off the diborane.

14. The method of separating diborane from gaseous mixtures containing diborane and hydrogen halides which comprises reacting the mixture with a picoline in substantially stoichiometric quantity with regard to the hydrogen halide present at temperatures below the boiling points of the components of the mixture, and distilling off the diborane.

15. The method of separating diborane from gaseous mixtures containing diborane and hydrogen halides which comprises reacting the mixture with a quinoline in substantially stoichiometric quantity with regard to the hydrogen halide present at temperatures below the boiling points of the components of the mixture, and distilling off the diborane.

16. The method of separating diborane from a gaseous mixture containing diborane and a hydrogen halide which comprises reacting the mixture with pyridine in substantially stoichiometric quantity with regard to the hydrogen halide present at temperatures below the boiling points of the said components of the mixture while cooling the mixture with liquid nitrogen and maintaining it under a reduced pressure of about $10^{-4}$ mm. mercury, and then distilling off the diborane by heating.

HERMANN I. SCHLESINGER.
HERBERT C. BROWN.

No references cited.